(12) United States Patent
López-Pozas Lanuza

(10) Patent No.: US 10,794,675 B2
(45) Date of Patent: Oct. 6, 2020

(54) BIODEGRADABLE AMMUNITION FOR FIREARMS

(71) Applicant: Luis Enrique López-Pozas Lanuza, Málaga (ES)

(72) Inventor: Luis Enrique López-Pozas Lanuza, Málaga (ES)

( * ) Notice: Subject to any disclaimer, the term of this patent is extended or adjusted under 35 U.S.C. 154(b) by 0 days.

(21) Appl. No.: 15/743,264

(22) PCT Filed: Jul. 10, 2015

(86) PCT No.: PCT/ES2015/070544
§ 371 (c)(1),
(2) Date: Jan. 9, 2018

(87) PCT Pub. No.: WO2017/009495
PCT Pub. Date: Jan. 19, 2017

(65) Prior Publication Data
US 2018/0209773 A1    Jul. 26, 2018

(51) Int. Cl.
*F42B 7/08* (2006.01)
*F42B 12/76* (2006.01)
*C08L 101/16* (2006.01)
*F42B 8/12* (2006.01)
*F42B 12/74* (2006.01)
*C08K 3/013* (2018.01)

(52) U.S. Cl.
CPC ............. *F42B 12/76* (2013.01); *C08K 3/013* (2018.01); *C08L 101/16* (2013.01); *F42B 8/12* (2013.01); *F42B 12/74* (2013.01); *F42B 12/745* (2013.01)

(58) Field of Classification Search
CPC .... F42B 12/76; F42B 7/08; F42B 7/02; F42B 99/00; C08K 5/0033; C08L 77/02
USPC ................................ 102/466, 449, 473, 532
See application file for complete search history.

(56) References Cited

U.S. PATENT DOCUMENTS

| 3,898,933 A | 8/1975 | Castera et al. |
| 4,753,172 A * | 6/1988 | Katzmann ............... F42B 12/06 102/517 |
| 5,263,417 A * | 11/1993 | Godfrey-Phillips ...... F42B 7/08 102/453 |

(Continued)

FOREIGN PATENT DOCUMENTS

| DE | 19924747 A1 | 12/2000 |
| DE | 10163415 A1 | 12/2001 |

(Continued)

OTHER PUBLICATIONS

IPER dated Oct. 4, 2017 for PCT Application No. PCT/ES2015/070544 in 9 pages.

(Continued)

*Primary Examiner* — Michael D David
(74) *Attorney, Agent, or Firm* — Knobbe, Martens, Olson & Bear, LLP

(57) ABSTRACT

Biodegradable non-lethal biodegradable ammunition for firearms, formed by a cartridge case comprising gas-forming means, a case base and a projectile, characterised in that the composition of said projectile comprises at least 30% of a biodegradable bioplastic in accordance to Standard UNE-EN-ISO 14855:2005 according to the ISO 14855:1999 analysis method and up to 70% of one or more inert and non-toxic mineral fillers, each selected from the group of carbonates or mineral salts.

18 Claims, 3 Drawing Sheets

(56) References Cited

U.S. PATENT DOCUMENTS

| | | | |
|---|---|---|---|
| 5,549,048 A | 8/1996 | Godfrey-Phillips et al. | |
| 5,859,090 A | 1/1999 | Shahid et al. | |
| 7,399,334 B1* | 7/2008 | Wei | C22C 1/045 102/448 |
| 7,422,720 B1* | 9/2008 | Wei | C22C 1/045 102/448 |
| 7,810,432 B2 | 10/2010 | Stevens | |
| 8,618,189 B2* | 12/2013 | Lake | C08K 5/09 428/411.1 |
| 10,139,206 B2* | 11/2018 | Havens | C08L 67/02 |
| 2012/0111219 A1* | 5/2012 | Burrow | C04B 35/64 102/467 |
| 2014/0076188 A1* | 3/2014 | Maljkovic | F42B 5/307 102/467 |
| 2014/0366765 A1 | 12/2014 | Havens et al. | |
| 2015/0020705 A1* | 1/2015 | Hartmann | F42B 12/50 102/369 |
| 2018/0128583 A1* | 5/2018 | Lopez-Pozas Lanuza | F42B 7/06 |
| 2018/0209773 A1* | 7/2018 | Lopez-Pozas Lanuza | C08K 3/013 |

FOREIGN PATENT DOCUMENTS

| | | |
|---|---|---|
| EP | 0775724 A1 | 5/1997 |
| ES | 2100342 T3 | 6/1997 |
| ES | 2373161 A1 | 2/2012 |
| ES | 2404030 A1 | 5/2013 |
| GB | 2422185 A | 7/2006 |
| GB | 2496180 A | 5/2013 |
| JP | 2002243399 A | 8/2002 |
| WO | 2012/097320 A1 | 7/2012 |
| WO | 2015/033081 A1 | 3/2015 |

OTHER PUBLICATIONS

ISR dated Mar. 28, 2016 for PCT Application No. PCT/ES2015/070544 in 4 pages.

* cited by examiner

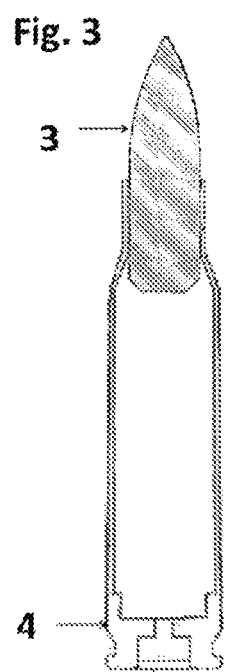
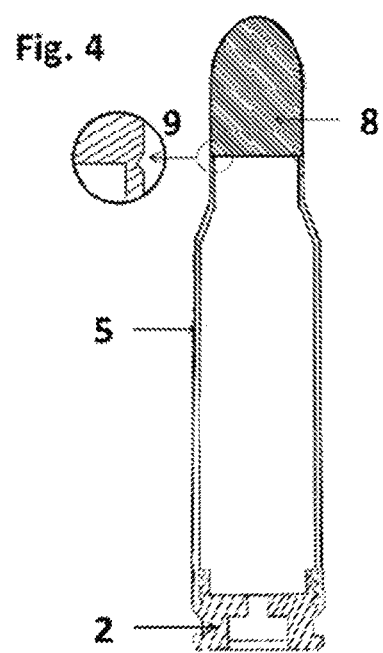

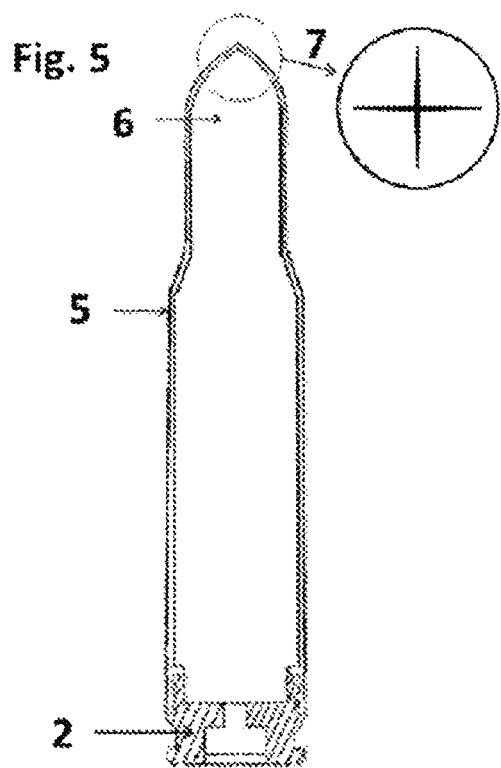

BIODEGRADABLE AMMUNITION FOR FIREARMS

CROSS-REFERENCE TO RELATED APPLICATION

This application is the U.S. National Phase under 35. U.S.C. § 371 of International Application PCT/ES2015/070544, filed Jul. 10, 2015.

FIELD OF THE INVENTION

The present invention relates to a variety of ammunition for use in firearms with the peculiarity of being non-lethal and biodegradable.

STATE OF THE ART

We can define a cartridge or bullet, or ammunition, as the set of necessary elements for firing a firearm: essentially a projectile, a cartridge case comprising gas-forming means (normally called fulminants, for example, gunpowder) and a case base comprising the necessary means for igniting said gas-forming means. In real fire ammunition and training ammunition (non-lethal), the projectile is projected due to the expansion of gases inside the cartridge case. In blank ammunition, the cartridge case has break lines such that, when the gases expand, the cartridge case breaks along said break lines, releasing the gases without projecting any solid element.

The ammunition has the appropriate size for fitting tightly inside the ignition chamber of a firearm. The fulminant comprises a small load of an impact-sensitive chemical element that may be located in the centre or on the edge of the rear part of the ammunition, being the initial cause of the shot.

All these types of conventional ammunition are full metal jacketed (case base, cartridge case and projectile), with some exceptions manufactured from conventional plastic materials, as in the case of blank ammunition.

The cartridge case, besides serving as a carrier of the projectile and gas-forming means (for example, gunpowder), is the part that brings together the other elements that compose the ammunition. The cartridge case consists of two essential parts: mouth and body. When the cartridge cases are of the bottle type (gulleted) we must add the neck (gullet) and shoulder.

The case base is the carrier of the primer capsule (percussion cap). It is the part of the ammunition where the primer substance in charge of triggering ignition is housed.

Ammunition with cartridge cases formed by common plastics are well known, which offer advantages over conventional ammunition, formed by cartridge cases and metal projectiles, such as, inter alia, a reduction in weight, lower manufacturing costs and faster manufacturing processes. The most common plastic ammunition is blank ammunition.

The cartridge cases, depending on the material from which they are manufactured, may be metallic and semi-metallic. In the case of metal cartridge cases, they must have special tenacity, malleability and elasticity conditions that enable them to support the expansions suffered at the time of firing, when they must press tightly against the walls of the chamber for the purpose of sealing it hermetically and, subsequently, recover its original size when the pressure of the gases decreases. These qualities are perfectly fulfilled by brass, which must have, for admission to factories in Spain, a composition of 72% of copper and 28% of zinc.

On the contrary, nearly all current semi-metallic cartridge cases have a moulded, one-piece plastic cartridge case.

Moreover, the use of metal ammunition has evolved to remove the most-polluting heavy metals, such as the lead of the projectile, but even so, both cartridge cases and metal projectiles continue to be an unsolved problem, since they remain in the environment for decades until they are degraded by oxidation, and are also especially polluting to water during this process.

The use of semi-metallic ammunition manufactured from non-biodegradable plastics also gives rise to significant ecological problems, since cartridge cases and projectiles, or pieces thereof, are left strewn across the natural ground without any type of waste treatment. The environmental pollution problem arises after the shot, when the cartridge case is expelled from the weapon and the projectile is projected, leaving both scattered on the ground and natural surroundings. The most conventional plastics currently used may take up to centuries to disappear from the environment. For this reason, hunting associations, firing ranges and security forces are currently demanding a biodegradable cartridge that also fulfils its inherent functions for practising these sports and training activities.

Non-lethal ammunition is used in military and civil applications for training, crowd control, firing practice, etc.

Document DE10163415 relates to 20 mm real fire ammunition comprising a metal core of aluminium, steel or the like coated with a biodegradable material. Besides not specifying the nature of said biodegradable composition, given the composition of the core, neither the projectile nor the ammunition as a whole can be considered to be biodegradable.

Document EP2663831 relates to blank ammunition and subsonic ammunition manufactured from a high-strength polymer formed by nylon and moulded glass fibres, which cannot be considered biodegradable.

Document GB496180 relates to ammunition, specifically mortar grenades. From a first reading of the document it can be inferred that the materials used to make them frangible include wheat straw dust, metallic minerals and lubricants such as soy bean, corn or palm oil, which differs from the properties required for the ammunition of a firearm. Although it mentions that the ammunition is biodegradable, it describes the presence of metals such as magnesium silicate and zinc stearate, incompatible with biodegradability. Only part of the mortar grenade will be biodegraded. Additionally, the objective of the patent is for the ammunition to be frangible or easily frangible, which would be the ultimate desired characteristic for the cartridge cases of any type of ammunition.

Document PCT/ES2015/070356 relates to a biodegradable cartridge for shotguns only suitable for shotguns, not for pistols, submachine guns or semi-automatic rifles. These cartridges for shotguns and non-lethal and biodegradable ammunition that we propose do not support the same physicomechanical pressures, comprise different internal elements, the ballistics applied is completely different due to the fact that shotgun barrels are not striated and, therefore, the compositions and mixtures of the materials are different.

Document GB 2 422 185 discloses shotgun shells whose cartridge case is made of a biodegradable material, essentially PVA, not of bioplastics of vegetable origin. In any case, the requirements of a shotgun shell are completely different to those of projectile ammunition. Similarly, US 2014/0366765 also discloses shotgun shells manufactured from polyhydroxyalkanoates (PHA).

Patent U.S. Pat. No. 5,859,090 discloses ammunition made from at least 98% of caprolactone. Caprolactone has a very low melting point which melts in continuous firing or environmental heat conditions, rendering the ammunition unusable and even dangerous for the shooter. Additionally, caprolactone is an oil derivative and, even if it could give rise to usable biodegradable ammunition, it stems from oil derivatives, which does not make it an ecological alternative.

Patents ES 2 373 161 and ES 2 404 030 relate to airsoft pellets for ammunition made from a biodegradable oil derivative. They are not therefore bioplastics of vegetable origin. Additionally, airsoft pellets have ballistic requirements that have nothing to do with those required to manufacture non-lethal or training ammunition comprising not only a pellet that is projected, but rather various parts (case base, cartridge case, projectile) which combine to operate a real firearm. Airsoft pellets are designed for a toy weapon.

Therefore, there is a need to provide non-lethal ammunition with an improved biodegradability profile while maintaining the necessary characteristics and properties for operation thereof.

SUMMARY OF THE INVENTION

The proposed invention fully solves the ecological problem created when, after firing, an act performed in the country, amid natural surroundings, the multiple pieces of cartridge cases and projectiles of the ammunition are scattered and buried in the ground. Therefore, an aspect of the invention is biodegradable non-lethal ammunition for firearms formed by a cartridge case comprising gas-forming means, a case base and a projectile, characterised in that the composition of said projectile comprises at least 30% of a bioplastic, of which at least 90% by weight is transformed into carbon dioxide, water and biomass in less than six months, according to standard ISO 14855 and up to 70% of one or more inert and non-toxic mineral fillers, each selected from the group of carbonates or mineral salts.

The present invention is based on a biodegradable raw material that confers the necessary elasticity while preventing breakage during use thereof, maintaining its biodegradability condition once used.

Moreover, the variety of ammunition we present solves other problems and presents new solutions in their use. The ammunition is not only non-lethal, but also non-traumatic, thereby reducing the danger of serious injuries while being completely realistic for training. In certain configurations it also allows the preparation of non-lethal biodegradable ammunition which, as opposed to other non-lethal ammunition, generates sufficient pressure for use in automatic and semi-automatic weapons.

BRIEF DESCRIPTION OF THE FIGURES

What follows makes reference to figures that help to better understand the description and show a specific, non-limiting mode of embodiment of the object of the present invention.

FIG. 3. Shows a cross-section of ammunition with the cartridge case and projectile forming two independent pieces.

FIG. 4. Shows a cross-section of ammunition with a cartridge case and projectile delimited by a break line, wherein the cartridge case and projectile form a single piece.

FIG. 5. Shows a cross-section of blank ammunition with a cartridge case and hollow bullet head in one piece, and a star-shaped break point.

Figure 1:
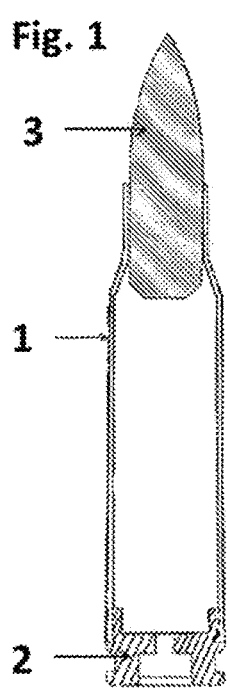
FIG. 1. Shows a cross-section of ammunition having the usual configuration with a cartridge case (1), case base (2) and projectile (3) manufactured independently and subsequently assembled.

The following numbered elements appear in said figures:
1) Cartridge case
2) Case base
3) projectile (independent piece of the cartridge case)
4) set of cartridge case and case base (one piece)
5) Cartridge case and projectile head forming a single piece
6) hollow projectile head
7) longitudinal break lines on the projectile head
8) part of the projectile in ammunition with a cartridge case and projectile
forming a single piece
9) Break line that delimits the cartridge case and projectile.

DETAILED DESCRIPTION OF THE INVENTION

Bioplastics

The present invention therefore relates to non-lethal ammunition formed essentially by a biodegradable bioplastic. A bioplastic is a plastic of natural origin produced by a living organism and is biodegradable in nature and does not require adding catalysts to the mixture for biodegradation. In the present invention, "bioplastics" is understood to be the polymers that fulfil Standard EN 13.432:2000, i.e. those that are biodegraded after firing to 90% by weight in less than six months according to Standard ISO 14855, i.e. those in which 90% of their mass by weight is transformed into carbon dioxide, water and biomass in 180 days. Preferably, at least 90% by weight is disintegrated in less than 12 weeks, to a size smaller than 2 millimetres, in accordance with ISO 16.929. The final products of aerobic degradation of the test material are: carbon dioxide, water, the mineral salts and the new microbial cellular constituents (biomass).

Additionally, other biodegradability standards, drafted by various normalisation bodies (ISO, CEN, ASTM, DIN, etc.), have various classification criteria: medium where the biodegradation occurs, chosen measurement variable, presence or absence of oxygen in the medium, etc. The international standards most widely used to determine the biodegradability and/or compostability of the plastic materials are as follows:

UNE-EN-ISO 14852:2005: Determination of the final aerobic biodegradability of plastic materials in an aqueous medium. Method according to the analysis of the carbon dioxide generated (ISO 14852:1999). Therefore, in one embodiment of the invention, said material is biodegradable in accordance with standard UNE-EN-ISO 14852:2005 according to analysis method ISO 14852:1999.

UNE-EN-ISO 14855:2005: Determination of the final aerobic biodegradability and disintegration of plastic materials in controlled composting conditions. Method according to the analysis of the carbon dioxide generated (ISO 14855:1999). Therefore, in one embodiment of the invention said material is biodegradable in accordance with standard UNE-EN-ISO 14855:2005 according to analysis method ISO 14855:1999.

UNE-EN-ISO 17556:2005: Determination of the final aerobic biodegradability in the ground by measuring oxygen demand in a respirometer or by means of the amount of carbon dioxide generated (ISO 17556:2003). Therefore, in one embodiment of the invention, said material is biodegradable in accordance with standard UNE-EN-ISO 17556:2005 according to analysis method ISO 17556:2003.

These testing standards are based on the fact that, during biodegradation of the test material in the presence of oxygen, carbon dioxide, water, mineral salts and new biomass are generated as products. The percentage of biodegradation is calculated based on the ratio between the carbon dioxide generated from the test material and the maximum theoretical amount of carbon dioxide that can be produced from the test material.

The requirements that must be fulfilled by a plastic product in order to be compostable are those established by European Standard EN 13.432, as follows:
Analysis of the material: consists of analysing the material in order to see its content in heavy metals, total organic carbon, total nitrogen, etc.
Biodegradability: the standard establishes the criterion that the container must be biodegraded to at least 90% in six months. To verify biodegradability, it recommends that Standard ISO 14855 preferably be followed.
Disintegration: it is verified whether the material is capable of degrading physically to fragments less than 2 mm in size. Standard ISO 16.929.
Compost quality: it is determined by comparing compost that includes plastic samples and a blank (compost without samples). Different parameters are analysed (metals, calcium, phosphorus, potassium, etc.) to ensure that the compost is suitable for agriculture. Ecotoxicity tests are also conducted on plants, analysing their growth on a substrate to which compost with plastic waste has been added and on a substrate without said waste. OECD Test 208.

In one embodiment of the invention, the material fulfils OECD Test 208. In another embodiment of the invention, the material is compostable in accordance with standard EN 13.432.

The term "non-lethal" is understood, in accordance with its general use in the arms industry, to be ammunition intended for incapacitate the target, minimising casualties and permanent personal damage, for example, by minimising fragmentation and/or penetration (US Department of Defence—"DoD"). In accordance with the present invention, "non-lethal" also includes training or low-firing ammunition that projects projectiles. It is ammunition containing a small gunpowder load and/or configured to break or ricochet upon impact without excessively penetrating the target. It also includes tracer ammunition. The present invention includes, for example, ammunition for firearms such as, inter alia, pistols, revolvers, rifles, carbines, submachine guns, machine guns, grenade launchers, armour-piercing ammunition or long range snipers.

The present invention makes it possible to fire a projectile in real fire conditions, but without lethal capacity, in order to become familiarised with the use of weapons, adapt to shooting sensations and train in the use of the weapons, such as the variety of reduced-load firing ammunition.

Another variety is intended for training with real forces without inflicting blunt trauma, minimising pain to a minimum and without causing serious bodily injury. Security forces train in their uniform and with the official equipment and compulsory accoutrements with which they address real situations, due to which the ammunition we present does not represent danger or serious injuries while faithfully reproducing a situation of real danger. Bullets in this type of ammunition may be solid, hollow, with dyes in their interior, fluorescent for work at night or frangible on impact.

It should be noted that the design of the projectile point, mass and impact speed directly affects their penetration capacity and, therefore, deadliness. In the non-lethal and biodegradable variety of ammunition we present, the ammunition intended for use against real forces will have a blunt head, light weight and low gunpowder load in order to achieve the desired ballistic effect while avoiding penetration or serious bruising.

The ammunition of the present invention has scarce or no penetration capacity, is not traumatic, does not incapacitate the target, does not inflict serious injuries on impact beyond cutaneous erosions and must be compatible with a series of automatic and semi-automatic weapons. The objective is to feel an impact with controlled power to make the training realistic.

On the contrary, non-lethal and biodegradable ammunition, for training with bullseyes, will be pointed, or more aerodynamic, similar in design to conventional real ammunition and have a greater gunpowder load with the objective of fulfilling the use for which is intended.

The advantages offered by the present invention over the aforementioned drawbacks are based on a biodegradable bioplastic preferably composed of biodegradable polymers of vegetable origin, such as PLA (polylactic acid), which preferably also comprises elastomeric polymers of vegetable origin such as rubber, latex or mixtures thereof. It also comprises an inert salt filler that solves the pollution problem once fired. Said filler is an inert and non-toxic mineral filler of the group of carbonates and mineral salts, such as, for example, calcium carbonate, sodium bicarbonate or barium sulphate, or a mixture thereof.

Moreover, another advantage is that the ammunition of the invention is suitable for all types of calibres and firearms, since its biodegradability characteristic will never be affected by design, shape or calibre, regardless of whether they are weapons of small calibre or for personal defence, recreational shooting guns, shotguns or even weapons of war or machine guns. Neither will the biodegradability characteristic be affected by the use made of the ammunition in the different existing varieties of ammunition, whether short range ammunition, training ammunition or tracer bullets.

Petroleum-derived plastic cartridges are highly pollutant both in their manufacture and in their degradation. In general, they have major drawbacks that are resolved in our invention. This invention relates to clean and odourless biodegradation produced by microorganisms, fungi and algae. The biodegradable ammunition for firearms of this invention does not attract insects and small rodents for consumption thereof.

The ammunition of the invention is biodegradable and stems from renewable energy sources that minimise environmental pollution, both in the obtainment of the raw material and in the manufacture and subsequent disappearance thereof from the environment by biodegradation, due to being based on the extrusion and injection of biodegradable bioplastics and thermoplastics. As a result, this invention provides cartridges for firearms having the same physicomechanical characteristics as conventional petrochemical plastics, or metal cartridges, but adding the condition of being biodegradable.

Bioplastics are preferably polymers of vegetable origin comprising a maximum of 99% of the mixture, plus an inert and non-toxic mineral filler of the group of carbonates and mineral salts, such as calcium carbonate, sodium bicarbonate or barium sulphate, or mixtures thereof. This group includes, inter alia, PLA (polylactic acid) type bioplastics, copolymer polyesters of the polyhydroxybutyrate (PHB) or polyhydroxyvalerate (PHV) type and pullulan (a polysaccharide).

In accordance with an alternative embodiment, the ammunition of the present invention comprises, besides bioplastic and the inert and non-toxic mineral filler, small amounts (no more than 10% by weight with respect to the total weight of the material) of thermoplastic polymers accompanied by a catalyst that triggers its biodegradation, for example, by means of oxo-degradation or photofragmentation or oxo-biodegradation. Non-limiting examples of these materials are conventional plastics such as, inter alia, PET, polyethylene (PE), polypropylene (PP), terephthalate polybutylene polycarbonate (PC-PBT), styrene, butadiene acrylonitryl-alpha polycarbonate (ABS-PC) and polyvinyl chloride (PVC), always added in combination with a catalyst, or degrading additive, that sensitises them such that ultraviolet solar radiation catalyses their degradation to progressively smaller pieces. Therefore, the biodegradation phenomenon refers to the digestion of the material by the biomass to generate carbon dioxide, water, mineral salts and more biomass (new microbial cellular constituents). These microorganisms produce enzymes that catalyse the rupture of the bioplastics into units more susceptible of being assimilated by microorganisms to produce biomass. On the contrary, biodegradation occurs in compound materials consisting of a biodegradable component and a non-biodegradable component such as, for example, a mixture of PLA or bioplastics based on starch and PP (propylene), a PVC-like conventional plastic, in a ratio of biodegradable material of at least 90% of the mixture. The rest of the material may be the mineral or a conventional thermoplastic and a catalyst to potentiate its biodisintegration. In accordance with one embodiment, the material comprises between 1% and 10% by weight with respect to the total weight of said thermoplastic polymer material and between 0.5% and 3% of an oxidising catalyst.

The ammunition of the invention must have an adequate specific weight, sufficiently high to be projected with precision, but sufficiently low to avoid penetrating the target and causing trauma or serious injuries. Acceptable ranges for the present invention are between 0.6 g/cm$^3$ to 6.0 g/cm$^3$. In accordance with a particular embodiment, the range is situated between 0.6 g/cm$^3$ and 2.0 g/cm$^3$, more particularly between 0.7 g/cm$^3$ to 1.8 g/cm$^3$, more particularly between 0.8 g/cm$^3$ and 1.7 g/cm$^3$.

The ammunition of the invention is composed of bioplastics preferably formed by elastomeric polymers of vegetable origin such as: rubber, latex or mixtures thereof. In accordance with a preferred embodiment, bioplastic is found in a proportion between 50% and 100% by weight. In accordance with another preferred embodiment, the bioplastic is PLA extracted from vegetable matter such as, for example, that selected from the group consisting of starches, celluloses and mixtures thereof. In accordance with another particular embodiment, the bioplastic is found in a proportion between 60% and 95% by weight. In accordance with another particular embodiment, the bioplastic is found in a proportion between 65% and 90% by weight.

Configurations of the Invention

Figure 2:
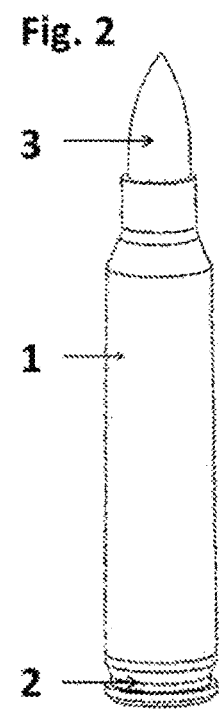
FIG. 2. Shows a general view of the ammunition of FIG. 1.

The cartridges of biodegradable firearms proposed in this invention are composed of a cartridge case (1), a case base (2) and a projectile (3), for example, as shown in FIGS. 1 and 2. Some of these elements may be integrated forming a single piece, for example, as shown in FIGS. 3, 4 and 5. Thus, for example, the cartridge case and case base may be made in one piece (5), as can be observed in FIGS. 4 and 5.

The projectile (3) or (8) of the invention comprises a bioplastic and an inert and non-toxic mineral filler. Other parts of the ammunition may be made of other materials such as, for example, metal, preferably brass. In accordance with an alternative embodiment, the case base (2) is made of metal, preferably brass. Alternatively, the case base and the cartridge case are both made of metal.

In accordance with an alternative embodiment of the invention, the composition of the cartridge case, the case base or both comprise at least 30% of a bioplastic of which at least 90% is transformed into carbon dioxide, water and biomass in less than six months according to Standard ISO 14855 and up to 70% of one or more inert and non-toxic minerals, each selected from the group of carbonates or mineral salts.

In accordance with another alternative embodiment, the ammunition comprises a metal case base, and the composition of the projectile and the composition of the cartridge case, each independently forming at least 30% of a bioplastic of which at least 90% by weight is transformed into carbon dioxide, water and biomass in less than six months according to Standard ISO 14855 and up to 70% of one or more inert and non-toxic mineral fillers, each selected from the group of carbonates or mineral salts. In a particular embodiment, the composition of the projectile and the composition of the cartridge case are the same, preferably wherein at least 90% of the composition of the projectile and of the cartridge case is the sum of said biodegradable plastic and said one or more inert and non-toxic mineral fillers.

In accordance with a particular embodiment, different parts of the ammunition comprise different materials.

The ammunition of the present invention may adopt various configurations. One possibility is the usual configuration, which corresponds to FIGS. 1 and 2, wherein the projectile (3) is a piece separated from the cartridge case (1) in contact with the cartridge case (1) and wherein the projectile (3) is configured to be projected at the time of formation of the gases. The hermetic seal or fit between the projectile (3) and the cartridge case (1) enables the expansion of the gases produced in the interior of the cartridge case (1) to project the projectile (3) with the desired speed upon firing. In this configuration, the case base (2), the cartridge case (1) and the projectile (3) can be manufactured as independent parts and subsequently assembled according to methods already known in the state of the art.

A more specific, non-limiting embodiment of this configuration exemplified in FIGS. 1 and 2 would be one wherein:

For the cartridge case (1), a material comprising a bioplastic composed of biodegradable elastomeric polymers of vegetable origin, for example, latex-derived rubber, is used in proportions between 90% and 100% by weight with respect to the total weight of the material, plus a mineral filler such as calcium carbonate, sodium bicarbonate or barium sulphate, in proportions of, for example, between 0% and 10% by weight with respect to the total weight of the material. In accordance with an alternative embodiment, the mineral filler is a maximum of 5% by weight with respect to the total weight of said material.

For the case base (2), manufactured by injection moulding, a material comprising a bioplastic composed of biodegradable polymers of vegetable origin such as PLA will be used in proportions of up to 15% by weight with respect to the total weight of said material, for example approximately 10% by weight with respect to the total weight of said material, plus a biodegradable elastomeric polymer (for example, a rubber of vegetable origin) in proportions of up to 95% by weight with respect to the total weight of said material, for example approximately 85% by weight with respect to the total weight of said material and a mineral filler, for example, calcium carbonate, in proportions of, for example, between 0% and 10% by weight with respect to the total weight of the material. In accordance with an alternative embodiment, the mineral filler is a maximum of 5% by weight with respect to the total weight of said material.

For the projectile (3), manufactured by injection moulding, a material comprising a bioplastic composed of biodegradable polymers of vegetable origin, such as PLA, will be used in proportions of up to 15% by weight with respect to the total weight of said material, for example approximately 10% by weight with respect to the total weight of said material, plus a biodegradable elastomeric polymer (for example, a rubber of vegetable origin) in proportions of up to 75% by weight with respect to the total weight of said material, for example approximately 65% by weight with respect to the total weight of said material, and a mineral filler, for example, calcium carbonate, in proportions of, for example, between 10% and 80% by weight with respect to the total weight of the material. In accordance with an alternative embodiment, the mineral filler is between 20% and 70%, preferably between 25% and 60%, by weight with respect to the total weight of said material. In accordance with an alternative embodiment, the ammunition of the invention comprises a cartridge case (1) and a case base made of a material comprising an elastomeric bioplastic of vegetable origin, for example, latex-derived rubber, in proportions between 95% and 100% by weight with respect to the total weight of the material, plus a mineral filler in a maximum of 5% by weight with respect to the total weight of said material; and a projectile (3) made of a material comprising a bioplastic composed of PLA in proportions between 5% and 15% by weight with respect to the total weight of said material, and of a biodegradable elastomeric polymer (for example, a rubber of vegetable origin) in proportions between 50% and 75% by weight with respect to the total weight of said material; and a mineral filler, for example, calcium carbonate, in proportions between 20% and 70% by weight with respect to the total weight of said material.

In an alternative embodiment, the ammunition of the invention comprises a metal case base, and wherein the composition of the projectile and the composition of the cartridge case each independently comprises at least 30% of a bioplastic, of which at least 90% by weight is transformed into carbon dioxide, water and biomass in less than six months according to standard ISO 14855 and up to 70% of one or more inert and non-toxic mineral fillers, each selected from the group of carbonates or mineral salts in the case of the projectile and up to 20% of one or more inert and non-toxic mineral fillers, each selected from the group of carbonates or mineral salts in the case of the cartridge case.

In another alternative embodiment, in the ammunition of the invention the composition of the cartridge case, the case base or both comprises at least 30% of a bioplastic of which at least 90% by weight is transformed into carbon dioxide, water and biomass in less than six months according to standard ISO 14855 and up to 20%, preferably 10%, preferably between 0% and 5%, of one or more inert and non-toxic mineral fillers, each selected from the group of carbonates or mineral salts.

In another alternative embodiment of the invention, in the ammunition the cartridge case and base case are made of a material comprising an elastomeric polymer of vegetable origin in proportions between 40% and 90% by weight with respect to the total weight of the material, plus a mineral filler in a maximum of 60% by weight with respect to the total weight of said material; and the projectile (3) is made of a material comprising a bioplastic composed of PLA in proportions between 50% and 100% by weight with respect to the total weight of said material, and a mineral filler in proportions between 0% by 10% by weight with respect to the total weight of said material.

In another embodiment, the case base is metallic and the composition of the cartridge case comprises at least 30% of a bioplastic, of which at least 90% by weight is transformed into carbon dioxide, water and biomass in less than six months according to standard ISO 14855, and up to 20%, preferably 10%, preferably between 0% and 5%, of one or more inert and non-toxic mineral fillers, each selected from the group of carbonates or mineral salts. In another embodiment the projectile comprises a bioplastic exclusively made of one or more elastomers, preferably in a maximum of 30% by weight.

Both the cartridge case (1), the case base (2) and the projectile (3) can be manufactured in accordance with any of the already known processes, preferably the injection moulding method.

The projectile is introduced by pressure through the neck of the cartridge case, leaving the mouth of the cartridge case hermetically sealed. The case base will be coupled to the cartridge case, which will contain the fulminant percussion cap, also leaving this part and, thus, the entire assembly, hermetically sealed.

A one-piece cartridge case with base case (4), and the projectile (3), can also be manufactured, which are subsequently assembled according to methods already known in the state of the art (see FIG. 3).

In another particular embodiment, the projectile and the cartridge case are manufactured as a single piece (5), wherein the projectile (8) and the cartridge case are delimited by breaking means (10), as shown in FIG. 4. The breaking means can be configured in different ways so that, at the time of firing, the expansion of gases that takes place in the interior of the cartridge case causes the breakage by said breaking means (10) and the projection of the projectile (8). There are therefore different possibilities for achieving this objective such as, for example, the use of break lines, a plurality of break points or a narrowing of the body walls. The cross-section of the projectile (8) may also comprise, in turn, breaking means that facilitate its breakage or disintegration on impact, thereby minimising penetration and avoiding lethal or irreversible damage to the target. The size of the ammunition will vary depending on the type of ammunition, its explosive charge and the use given thereto. These processes give rise to various combinations of ammunition, in accordance with their purpose and with the weapon for which they are configured.

Despite forming a single piece, the projectile and the cartridge case may be made of different materials, for example, if it is manufactured by the double injection moulding system. In this manner, a single piece can be obtained wherein the cartridge is flexible and non-frangible, and the projectile is frangible. It also enables the obtainment of specific configurations such as, for example, that the projectile is heavier and/or has a different colour (and/or fluorescent). Thus, in accordance with a particular embodiment, the ammunition of the present invention comprises a projectile and a cartridge case manufactured in a single piece (5), and a case base (2), wherein the cartridge case and case base are made of a material comprising an elastomeric bioplastic of vegetable origin, for example, latex-derived rubber, in proportions between 95% and 100% by weight with respect to the total weight of the material, plus a mineral filler in a maximum of 5% by weight with respect to the total weight of said material; and the projectile (3) is made of a material comprising a bioplastic composed of PLA in proportions between 5% and 15% by weight with respect to the total weight of said material and of a biodegradable elastomeric polymer (for example, a rubber of vegetable origin) in proportions between 50% and 75% by weight with respect to the total weight of said material; and a mineral filler, for example calcium carbonate, in proportions between 20% and 70% by weight with respect to the total weight of said material.

In one embodiment of the invention, the projectile is hollow and houses one or more products in its interior. In accordance with this embodiment, the projectile walls form a cavity that houses, for example, a dye such that, on impact, the projectile releases the dye, marking the bullseye. In accordance with one embodiment of the invention, said dye may be a powder, a gel or a liquid, inter alia, comprising some type of dye, and includes fluorescent dyes, wherein said bioplastic is fluorescent or contains or is coated with non-toxic and biodegradable fluorescent pigment.

In addition to reducing the amount of gunpowder, low-power firing can be achieved by thickening the cartridge case walls, thereby limiting the space available for the gas-forming means (for example, gunpowder). This also enables the cartridge case to surprisingly maintain features similar to those of metal cartridge cases. These cartridge cases, made of biodegradable polymers and with thicker walls, support manufacturing better, enabling a tighter fit with the projectile and, therefore, a better use of the gases formed during firing. They also provide a more resistant cartridge case. Moreover, this configuration generates sufficient pressure during firing to activate the automatic reloading system, which is a problem with other training ammunition. Therefore, in accordance with a preferred embodiment, the thickness of the cartridge case walls is comprised between 0.3 and 3 mm, preferably between 0.3 and 2 mm, more preferably between 0.5 and 2 mm, more preferably between 0.8 and 2 mm.

In addition to the aforementioned configurations, the ammunition of the invention comprises gas-forming means, preferably gunpowder. In order to minimise damage and ensure maximum avoidance of casualties or irreversible damages, the ammunition of the invention comprises a smaller load by weight of said gas-forming means, with respect of the maximum possible load, for example, between 20% and 80% by weight of the maximum load of gas-forming means.

The ammunition of the present invention may also be blank ammunition, as exemplified in FIG. 5. Said blank ammunition, besides the biodegradable materials described herein, comprises a one-piece cartridge case with projectile (5) and a case base (2), assembled by known means. That which would correspond to the projectile (6) is hollow and has notches, or break points, for example cross- or star-shaped (7), to enable the outflow of gases. In this manner, no projectile is projected in the biodegradable blank ammunition; upon firing, the gases expand, exerting pressure on the notches or break points (7). In this manner, the projectile head breaks, allowing the release of gases without projecting a projectile. The composition of the materials that form the different parts of the blank ammunition may be any of the embodiments described in the present invention.

What is claimed is:

1. Biodegradable non-lethal ammunition for firearms having a specific weight of 0.6-6 g/cm3 formed by:
   (i) a cartridge case comprising gas-forming means, wherein the wall thickness is comprised between 0.3 and 3 mm,
   (ii) a case base and
   (iii) a projectile, wherein the composition of said projectile comprises:
   at least 30% of a bioplastic, of which at least 90% by weight is transformed into carbon dioxide, water, and biomass in less than six months according to standard ISO 14855 and
   a mineral filler in proportions between 20% and 45% by weight with respect to the total weight of said bioplastic selected from the group of carbonates or mineral salts,
   wherein said bioplastic is composed of polylactic acid (PLA) in proportions between 5% and 15% by weight with respect to the total weight of said bioplastic, and of a biodegradable elastomeric polymer in proportions between 50% and 75% by weight with respect to the total weight of said bioplastic, and
   wherein the cartridge case and case base are made of a material comprising an elastomeric bioplastic of vegetable origin in proportions between 95% and 100% by weight with respect to the total weight of the material, plus a mineral filler in a maximum of 5% by weight with respect to the total weight of said material.

2. The ammunition, according to claim 1, wherein the thickness of the cartridge case wall is comprised between 0.5 and 2 mm.

3. The ammunition, according to claim 1, wherein the specific weight of the mixtures ranges between 0.6 and 2 g/cm3.

4. The biodegradable ammunition, according to claim 1, wherein said bioplastic comprises at least one elastomeric polymer of vegetable origin selected from rubber, latex or a mixture thereof.

5. The biodegradable ammunition for firearms, according to claim 1, wherein said PLA is extracted from vegetable materials.

6. Biodegradable ammunition for firearms, according to claim 5, wherein said PLA is extracted from vegetable material selected from the group consisting of starches, celluloses and mixtures thereof.

7. The ammunition, according to claim 1, wherein said mineral fillers are mineral filler in the projectile is selected from the group consisting of calcium carbonate, sodium bicarbonate, barium sulphate and mixtures thereof.

8. The ammunition, according to claim 1, wherein the projectile walls form a cavity that houses a dye.

9. The ammunition, according to claim 8, wherein said dye is fluorescent.

10. The ammunition, according to claim 1, wherein said bioplastic is fluorescent or contains or is coated with at least one non-toxic and biodegradable fluorescent pigment.

11. The ammunition, according to claim 1, wherein said gas-forming means comprise gunpowder.

12. The ammunition, according to claim 1, comprising a smaller load by weight of said gas-forming means, with respect to the maximum possible load.

13. The ammunition, according to claim 12, comprising between 20% and 80% by weight of the maximum load of gas-forming means.

14. The ammunition, according to claim 1, wherein the projectile is a piece separated from the cartridge case in contact with the cartridge case and configured to be projected at the time of formation of the gases.

15. The ammunition, according to claim 1, wherein the projectile and the cartridge case are delimited in a single body through breaking means.

16. The ammunition, according to claim 15, wherein said breaking means comprise a break line or a plurality of break points.

17. The ammunition, according to claim 16, wherein said break line is a narrowing in the body wall.

18. The ammunition, according to claim 1, wherein said projectile comprises a blunt end configured to minimize penetration capacity during impact.

* * * * *

UNITED STATES PATENT AND TRADEMARK OFFICE
CERTIFICATE OF CORRECTION

| | | |
|---|---|---|
| PATENT NO. | : 10,794,675 B2 | Page 1 of 1 |
| APPLICATION NO. | : 15/743264 | |
| DATED | : October 6, 2020 | |
| INVENTOR(S) | : Luis Enrique Lopez-Pozas Lanuza | |

It is certified that error appears in the above-identified patent and that said Letters Patent is hereby corrected as shown below:

In the Claims

In Column 12, Line 17 (approx.), Claim 1, delete "cm3" and insert --$cm^3$--.

In Column 12, Line 48, Claim 3, delete "cm3" and insert --$cm^3$--.

In Column 12, Line 56, Claim 6, delete "Biodegradable" and insert --The biodegradable--.

In Column 12, Line 61, Claim 7, delete "mineral fillers are mineral" and insert --mineral--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*